United States Patent [19]
Kanaan

[11] Patent Number: 5,944,327
[45] Date of Patent: Aug. 31, 1999

[54] COLLET CHUCK DEVICE

[75] Inventor: Roger J. Kanaan, Easley, S.C.

[73] Assignee: Power Tool Holders Incorporated, Wilmington, Del.

[21] Appl. No.: 08/959,421

[22] Filed: Oct. 28, 1997

[51] Int. Cl.⁶ .................................................. B23B 5/22
[52] U.S. Cl. .................. 279/51; 279/54; 279/56
[58] Field of Search .................................. 279/51, 54, 56, 279/58, 59, 48

[56] References Cited

U.S. PATENT DOCUMENTS

| | | |
|---|---|---|
| 1,410,080 | 3/1922 | Schwahlen . |
| 1,488,001 | 3/1924 | Clare . |
| 2,346,706 | 4/1944 | Stoner . |
| 2,563,112 | 8/1951 | Hill et al. . |
| 2,784,976 | 3/1957 | Ondeck . |
| 3,035,845 | 5/1962 | Benjamin . |
| 3,365,204 | 1/1968 | Benjamin et al. .......................... 279/51 |
| 3,544,121 | 12/1970 | Mizoguchi . |
| 3,589,486 | 6/1971 | Kelch . |
| 3,671,050 | 6/1972 | Andersonn et al. ....................... 279/51 |
| 3,811,361 | 5/1974 | Seely et al. . |
| 3,894,743 | 7/1975 | Hiroumi . |
| 4,692,073 | 9/1987 | Martindell . |
| 4,708,548 | 11/1987 | Taylor et al. . |
| 4,721,423 | 1/1988 | Kubo . |
| 4,799,838 | 1/1989 | Kubo et al. . |
| 5,096,213 | 3/1992 | Terwilliger et al. ....................... 279/51 |
| 5,431,420 | 7/1995 | Huff et al. . |
| 5,511,801 | 4/1996 | Kanaan et al. . |
| 5,522,605 | 6/1996 | Lewis et al. ................................ 279/56 |
| 5,567,100 | 10/1996 | Nakamura . |
| 5,577,872 | 11/1996 | Nakamura . |
| 5,788,248 | 8/1998 | Gibson ....................................... 279/59 |
| 5,820,136 | 10/1998 | Han et al. ................................... 279/58 |

FOREIGN PATENT DOCUMENTS 57-184610  11/1982  Japan .

OTHER PUBLICATIONS

U.S. application No. 08/735,656.

*Primary Examiner*—William Briggs
*Assistant Examiner*—Rouzbeh Tabaddor
*Attorney, Agent, or Firm*—Dority & Manning

[57] ABSTRACT

A collet chuck device has a body member with a frusto-conical recess defined therein. A collet is disposed within the recess. A nut member is rotationally configured on the body member to move the collet axially within the recess. The nut member has an outer sleeve member and an inner sleeve member concentric within the outer sleeve member. The inner sleeve member is threadedly engaged on threads defined on the body member and contains ball grooves defined on an outer circumferential surface thereof. The outer sleeve member has ball grooves defined on the inner circumferential surface thereof and rolling bodies are operably disposed in the ball grooves so that the outer sleeve member is rotatable relative to the inner sleeve member. Upon rotation of the nut member on the body member in the tightening direction, the outer sleeve member advances axially in the tightening direction relative to the inner sleeve member through engagement of the rolling bodies in the ball grooves and thereby forces the collet further into the frustoconical recess.

13 Claims, 3 Drawing Sheets

5,944,327

COLLET CHUCK DEVICE

BACKGROUND OF THE INVENTION

The present invention relates to a chuck device for holding tool bits to a drive shaft of a power tool or machine tool, and more particularly to a quick release chuck device incorporating a collet which is particularly useful in machining applications, such as routing, drilling, milling, and boring applications.

Conventional tool holding devices incorporate a body member or collet tool holder having a tapered collet that conforms to a hollow cone or recess defined in the body member. In certain applications, such as routers, the body member may comprise the end portion of the drive shaft and the hollow cone or recess may be defined in the end of the shaft. Typically, a threaded nut is provided having a conical cam surface which matches the conical surface of the outer forward collet face. During operation of this type of conventional device, the drive spindle or chuck of the machine tool must be held stationary in order to tighten the collet nut sufficiently. Flats are defined on the outer circumferential surface of the nut member so that a wrench can be engaged on the nut member to provide a sufficient tightening torque. For this reason, most router chucks and tool holders utilizing collets have spindle locks or are provided with extra wrenches for holding the drive shaft stationary and tightening the nut member onto the body member. Similarly, to release the tool, the machine shaft or chuck body must again be held stationary while the nut member is loosened with a wrench.

These known conventional devices have a number of drawbacks. For example, the tightening and loosening procedure has proven to be cumbersome and requires a separate device, such as a wrench, for locking the spindle shaft or for applying a tightening force to the nut member. Additionally, the degree of tightening of the nut member is limited by the frictional interface between the nut member and body member. Inconsistent nut tightening can create high stresses in the threads of the nut and tool holder causing damage in cases of overtightening.

Various attempts have been made in the art to provide improved chuck devices incorporating collets, particularly for high speed machine tools such as routers. U.S. Pat. No. 5,511,801 issued to Kanaan et al., for example, provides a significant improvement in the art. The '801 patent discloses an integrated collet and chuck device which is actuated by turning a sleeve relative to a body member, with the sleeve having a nut fixed therein. The nut engages a screw member which is rotatably concentric within the nut. Rotation of the nut drives the screw member in the longitudinal direction and the screw member engages a collet thereby causing the collet to grip on a tool shank.

The present invention provides an improvement to the state of the art of chuck devices utilizing collets.

OBJECTS AND SUMMARY OF THE INVENTION

Therefore, a principal object of the present invention is to provide a quick release chuck device incorporating a collet for securing a tool bit or working device to a drive spindle of a machine tool.

A further object of the invention is to provide an integrated collet and chuck device which does not require a wrench or external device for applying sufficient tightening torque to the collet engaging member.

And yet a further object of the present invention is to provide a collet and chuck device wherein frictional resistance of the operating member is substantially eliminated thereby allowing for the device to be tightened and loosened by manual operation.

Still another object of the present invention is to provide an improved chuck device for machine tools such as routers, laminate trimmers, dry wall cutters, boring machines, milling machines, drills, and the like.

Additional objects and advantages of the invention will be set forth in part in the description which follows, and in part will be obvious from the description, or may be learned through practice of the invention. The objects and advantages of the invention may be realized and obtained by means of the instrumentalities and combinations particularly pointed out in the appended claims.

To achieve the objects and in accordance with the purposes of the invention, a chuck device is provided having a body member with a frustoconical recess defined therein. A collet is operationally disposed within the frustoconical recess. The body member has threads defined on an outer circumferential surface thereof. A nut member is rotationally configured with the body member to move the collet axially within the frustoconical recess. As is well understood by those skilled in the art, as the collet moves axially into the frustoconical recess, the gripping members of the collet are compressed radially inward and grip upon a tool shank inserted into the collet.

A nut member is included having an outer sleeve member and an inner sleeve member concentric within the outer sleeve member. The inner sleeve member has a threaded inner circumferential surface for threaded engagement with the body member threads. The inner sleeve member also has ball grooves defined on an outer circumferential surface thereof. The outer sleeve member has ball grooves defined on the inner circumferential surface thereof radially opposite the ball grooves defined on the inner sleeve member. Rolling bodies, such as ball bearings, are operably disposed in the inner sleeve member and outer sleeve member ball grooves. Preferably, the rolling bodies are contained in a ball cage. The outer sleeve is axially movable relative to the inner sleeve member and further comprises a collet engaging member which engages and moves the collet axially within the frustoconical recess.

With the structure noted above, upon rotation of the nut member on the body member in a tightening direction, the outer sleeve member and inner sleeve member act as a single unit as the nut member is initially threaded onto the body member due to a limited rotational frictional load defined between the outer sleeve member and inner sleeve member primarily by a click ring mechanism disposed between the two sleeve members. As the nut member is screwed further onto the body member and friction between the collet and body member, as well as between the threads on the inner sleeve member and body member, increases, the initial frictional load between the inner and outer sleeve members is overcome and the inner sleeve member will cease to rotate. At this point, the outer sleeve member will continue to rotate relative to the inner sleeve member through engagement of the rolling bodies within the ball grooves. Preferably, the pitch of the ball grooves is less than that of the threads between the body member and inner sleeve member. The outer sleeve member advances axially relative to the inner sleeve member and, in so doing, engages the collet and forces the collet further into the frustoconical recess. In this regard, a collet engaging member is incorporated with the outer sleeve member and, preferably, comprises a thrust washer or member that is rotationally coupled to the outer sleeve member to decrease friction between the outer sleeve member and the collet.

Thus, the frictional loads between the operating members of the device are virtually overcome so that the nut member can be sufficiently tightened without the necessity of a wrench or other torquing device.

DETAILED DESCRIPTION OF THE PREFERRED EMBODIMENTS

Figure 1:
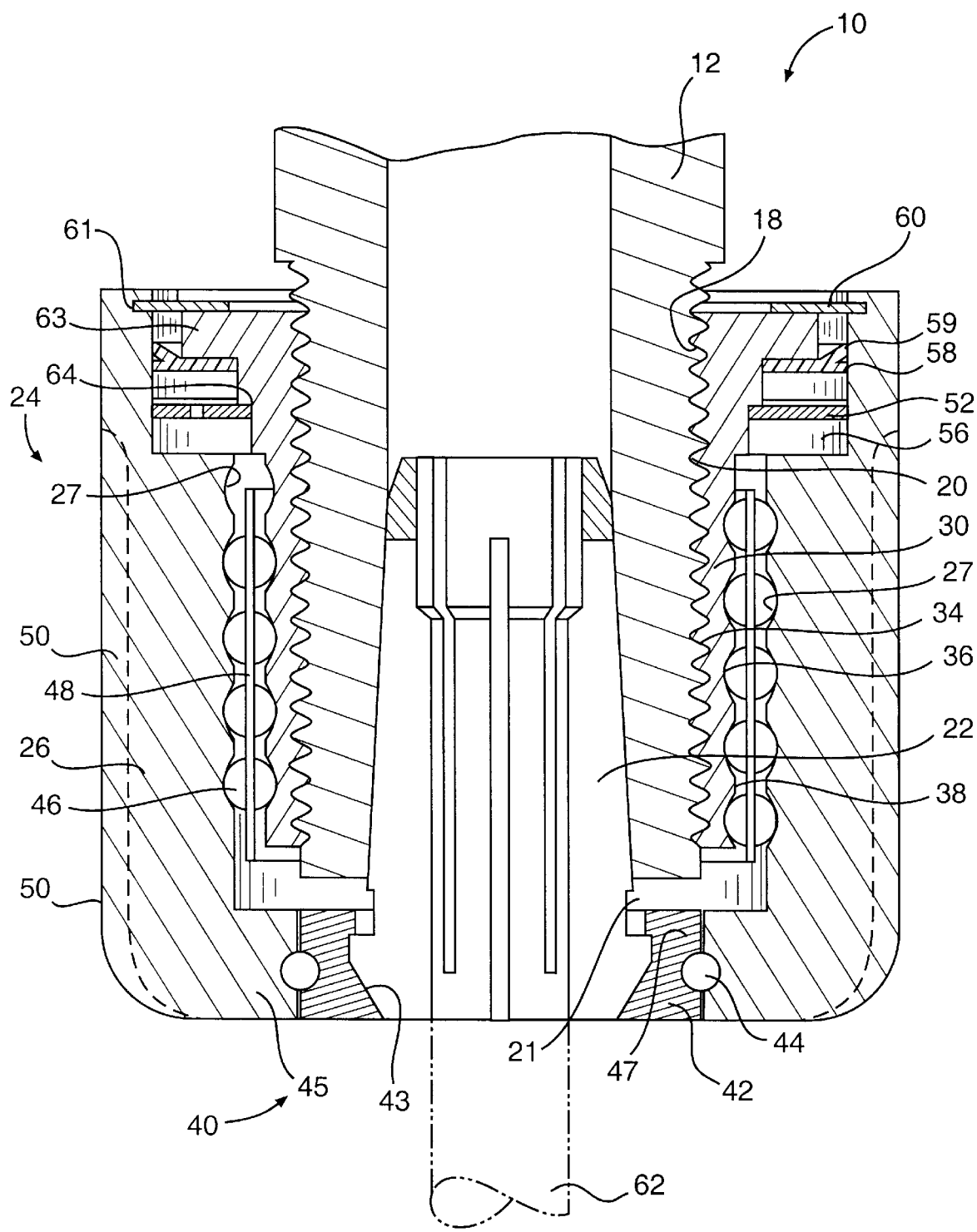
FIG. 1 is a cross-sectional component view of a chuck device according to the invention illustrated in an initial loosened or untightened position.

Reference will now be made in detail to the presently preferred embodiments of the invention, one or more examples of which are illustrated in the drawings. Each example is provided by way of explanation of the invention, and not as a limitation of the invention. In fact, it will be apparent to those skilled in the art that various modifications and variations can be made in the present invention without departing from the scope or spirit of the invention. For example, features illustrated or described as part of one embodiment can be used on another embodiment to yield a still further embodiment. Thus, it is intended that the present invention cover such modifications and variations that come within the scope of the appended claims and their equivalents.

The present collet holding chuck device is generally identified as element 10 in the drawings. Device 10 is used to hold a tool bit 61 (FIG. 1) to a drive spindle of a power or machine tool. Chuck device 10 is particularly well suited for high speed applications wherein the benefits of a collet holding device are particularly well suited, such as with routers, laminate trimmers, dry wall cutters, toolholders for drilling, milling, boring, etc. However, this is in no way meant as a limitation of the invention. Chuck device 10 can be utilized in any application wherein it is desired to hold a tool bit to a drive spindle of a machine tool with a collet holding device.

Although not particularly illustrated in the figures, it should be understood that the chuck device can be mounted to a drive spindle of a machine tool by any conventional mounting configuration. For example, a number of conventional systems are well known in the art for holding or retaining collet tool holders to a tool or drive spindle. Any and all such mounting configurations are within the scope and spirit of the invention and may be utilized to mount chuck device 10 to a tool or drive mechanism. For example, a threaded engagement between the body member and the drive spindle may be utilized, as well as a ball and detent device, mechanical interlocks, etc. Additionally, it is also within the scope of the invention to define the body member directly on the end of a drive shaft, as with conventional routers. The particular design and mounting system for the body member is not particularly relevant to the present invention and any and all conventional devices can be utilized.

Referring to the figures in general, chuck device 10 includes a body member 12 having a frustoconical chamber or recess 16 defined through the forward end thereof. Chamber 16 houses a removable collet 22. Collet 22 can comprise any conventional type of collet. For example, the typical split steel collet illustrated in the figures may be utilized. In an alternative embodiment, collet 22 may comprise a plurality of individual longitudinal gripping jaws held in a spaced apart relation by resilient material disposed between the gripping jaws, such as the Ultru™ Rubber-Flex® collets from Jacobs® Chuck Manufacturing Company. Both of these types of conventional collets are well known to those skilled in the art. Also, the operation and principles of such collets are well known and a detailed description thereof is not necessary for purposes of this disclosure.

Body member 12 includes an outer circumferential surface, generally 20, having threads 18 defined thereon. A nut member, generally 24, is rotationally configured with body member 12 to move collet 22 axially within frustoconical recess 16.

Nut member 24 includes an outer sleeve member 26 and an inner sleeve member 30. Outer sleeve member 26 has an outer circumferential surface 28 with grip enhancing ridges 50 formed therein. It should be understood that the grip enhancing surface can comprise any manner of textured or formed surface to enhance ergonomics. Outer sleeve member 26 has an inner circumferential surface having ball grooves 27 formed therein. A circumferential band of detents 56 are disposed axially rearward of ball grooves 27. Outer sleeve member 26 also includes a forward end with a collet engaging member 40 configured therewith. In the embodiment illustrated, collet engaging member 40 includes a ring member 42 that is rotationally coupled within a forward flange section 45 of outer sleeve member 26. Bearings 44 are housed in radially opposite races defined in ring member 42 and flange member 45. Thus, it should be understood, that ring member 42 will move axially with outer sleeve member 26, but will remain rotationally stationary as outer ring member 26 is rotated. Ring member 42 contains a cammed surface 43 for contacting the forward end of collet 22. A retaining ridge or lip 47 engages within recess 21 defined in collet 22 so that the collet can be extracted or moved axially forward out of frustoconical recess 16 when outer sleeve member 26 is rotated in a loosening direction.

Inner sleeve member 30 of nut member 24 includes an outer circumferential surface 38 having ball groves 36 defined therein. Ball grooves 36 have the same pitch as ball grooves 27 defined in outer sleeve member 26. Inner sleeve member 30 also includes a flange member 63 at the axially rearward end thereof and a shoulder 64 defined axially forward of flange 63. Threads 34 are defined on the inner circumferential surface of inner sleeve member 30. Threads 34 engage with threads 18 defined on body member 12. Preferably, the pitch of ball grooves 27, 36 is less than that of threads 18, 34.

Chuck device 10 includes rolling bodies 46, such as ball bearings, operably disposed in the ball grooves 36, 27. Preferably, rolling bodies 46 are held in a ball cage 48 and are equally spaced around the circumference of the ball grooves. Thus, outer sleeve member 26 is rotatable relative to inner sleeve member 30 once an initial frictional loading between the components is overcome, as explained in more detail.

A seal 58 is disposed around inner sleeve member 30 adjacent to flange member 63. Seal 58 contains lips that seal against the inner surface of outer sleeve member 26, as particularly illustrated in FIGS. 1 and 2. The lips 59 also slide against the inner surface of sleeve member 26.

A retaining ring 60 is fitted into a groove 61 defined in outer sleeve member 26. Retaining ring 60 prevents outer sleeve member 26 from being rotated completely off of inner sleeve member 30. However, it should be understood, that retaining ring 60 can be radially compressed and disengaged from groove 61 so that outer sleeve member 26 is removable from the inner sleeve member for maintenance or part replacement.

A mechanism is provided with device 10 to securely hold or retain outer sleeve member 26 in a rotated position relative to inner sleeve member 30. In the embodiment illustrated, this device comprises a click ring 52 press-fitted onto inner sleeve member 30 against shoulder 64. Click ring 52 is non-rotatable under load relative to inner sleeve member 30 and includes a plurality of arm members 54 having protuberances 55 formed on the end thereof. Arm members 54 are radially compressible and protuberances 55 engage in detents 56 defined in the inner surface of outer sleeve member 26, as particularly seen in FIGS. 1 and 2. As outer sleeve member 26 is rotated relative to inner sleeve member 30, protuberances 55 alternately engage and disengage from detents 56. When engaged in detents 56, arm members 54 and protuberances 55 rotationally "lock" outer sleeve member 26 relative to inner sleeve member 30 and, thus, prevent inadvertent loosening of the device. Click ring 52 also generates an audible and physical "click" as the protuberances 55 alternately engage and disengage with detents 56, thereby providing the operator with a physical feel and audible indication of the degree of tightening of outer sleeve member 26.

FIG. 1 illustrates chuck device 10 in an initial untightened or loosened condition wherein nut member 24 with collet 22 has been initially threaded onto body member 12. It should be understood that inner sleeve member 30 and outer sleeve member 26 will rotate as a single component due to the initial frictional loading between the components supplied primarily by arm members 54 engaging in detents 56. As nut member 24 is screwed further onto body member 12, friction increases between collet 22 which is forced axially further into recess 16, and body member 12, as well as between threads 18 and 34. At some point, this friction will overcome the initial frictional loading between inner sleeve member 30 and outer sleeve member 26. At this point, inner sleeve member 30 will cease to rotate and outer sleeve member 26 will rotate relative to inner sleeve member 30 through engagement of rolling bodies 46 and ball grooves 27, 36. Thus, further manual rotation of outer sleeve member 26 will cause the outer sleeve member to advance axially rearward relative to inner sleeve member 30. As outer sleeve member 36 moves axially rearward, collet 22 is forced axially further into recess 16 through engagement of ring member 42 with the collet. Ring member 42 will not rotate with outer sleeve member 26 due to bearings 44. Thus, a substantial frictional load is overcome in this regard.

Figure 2:
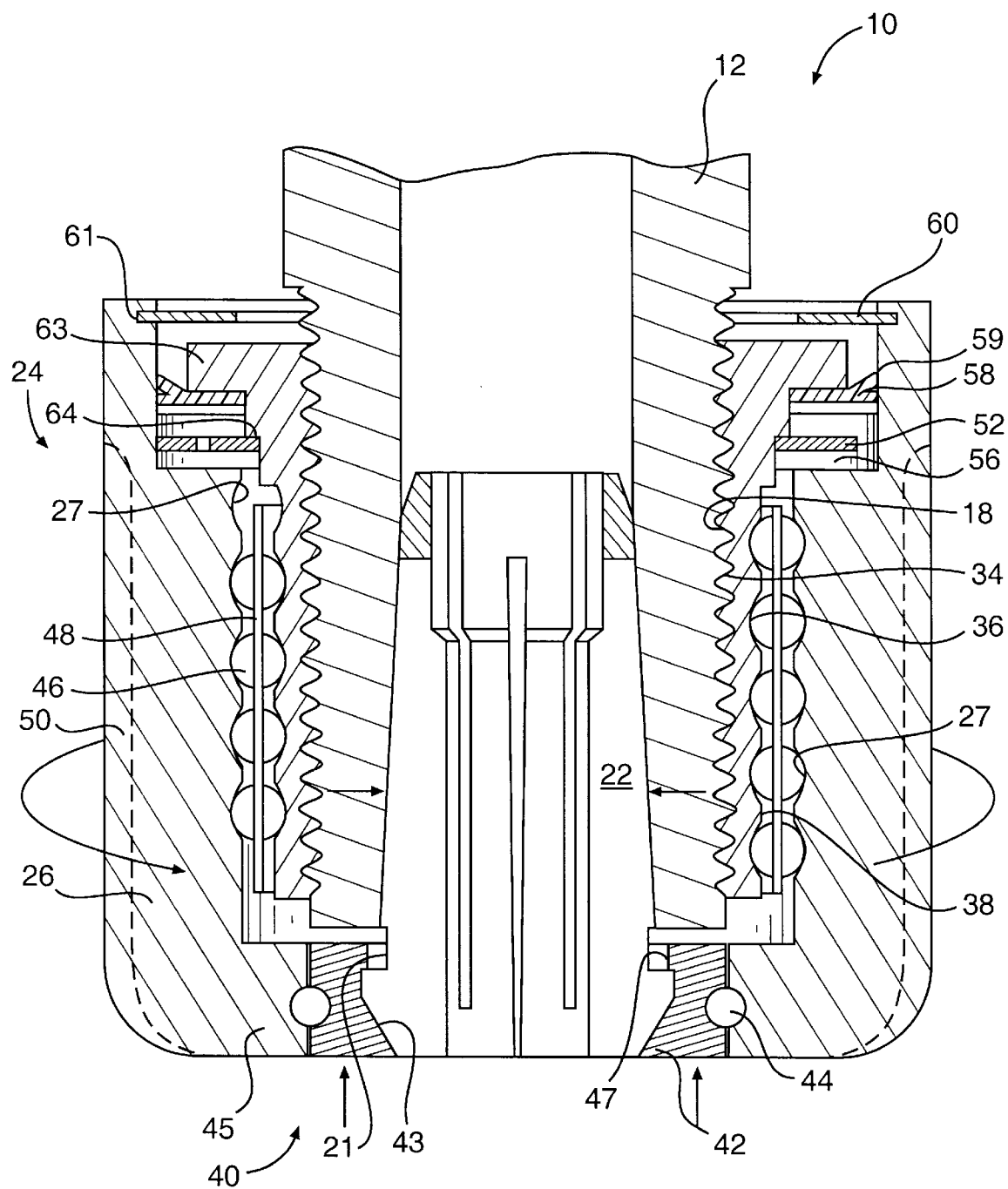
FIG. 2 is a cross-cut operational view of the chuck device shown in FIG. 1 in a tightened position.
Figure 3:
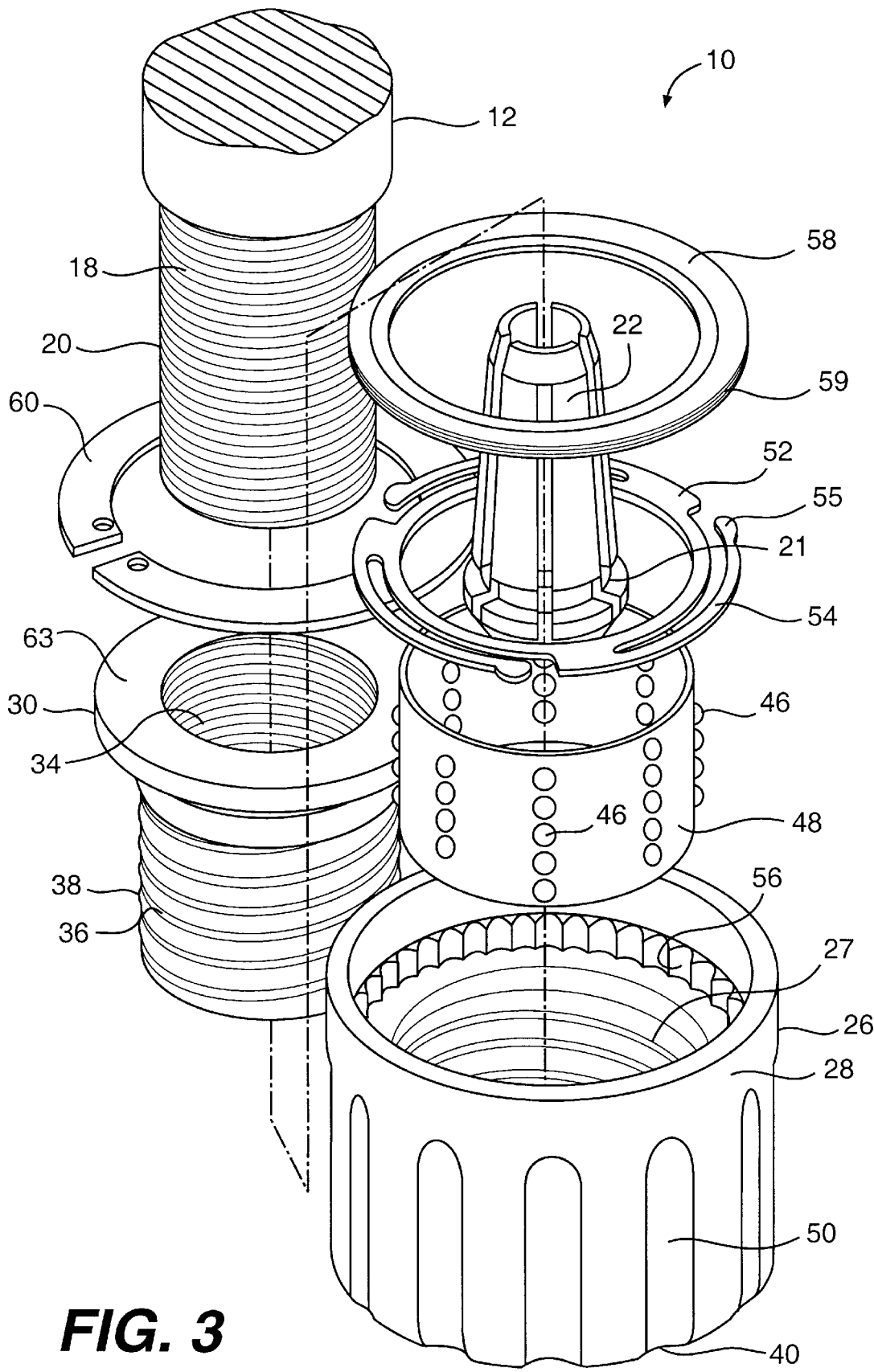
FIG. 3 is an in-line component view of the chuck device according to the invention.

FIG. 2 illustrates the device in its tightened configuration. FIG. 2 particularly illustrates that outer sleeve member 26 has advanced axially rearward relative to inner sleeve member 30, and that collet 22 has been forced axially rearward into recess 16. As the outer sleeve member moves axially rearward, the lips 59 of seal 58 slide against the outer sleeve member and protuberances 55 of click ring 52 also move axially within detents 56. Outer sleeve member 26 is rotationally held in its tightened rotational position through engagement of the click ring and detents 56.

To loosen the device, the operator merely rotates outer sleeve member 26 in an opposite loosening direction. In this manner, outer sleeve member 26 will move axially forward relative to inner sleeve member 30 and retaining lip or ridge 47 will pull collet 22 out of recess 16. Click ring 52 will act in the same manner with detents 56 when outer sleeve member 26 is rotated in the loosening direction. At some point, the frictional loading between arms 54 of click ring 52 and detents 56 (which can be modified by changing the configuration of arms 54), as well as the system loading between the inner and outer sleeve members, will be greater than the frictional load generated between threads 18, 34 and the two sleeve members will then rotate in the loosening direction as a single unit. In this manner, nut member 24 can be completely unthreaded or removed from body member 12 for changeout or replacement of collet 22 if necessary. However, it should be understood, that nut member 24 does not need to be completely unthreaded or removed from body member 12 in order to remove tool shank 62 from collet 22. The device can be loosened to the position illustrated in FIG. 1 which allows the collet to lose its grip on tool shank 62.

It should be understood by those skilled in the art that various modifications and variations can be made in the present invention without departing from the scope and spirit of the invention. It is intended that such modifications and variations be included in the present application as come within the scope of the appended claims and their equivalents.

What is claimed is:

1. A collet chuck device, comprising:

a body member having a frustoconical recess defined therein and threads defined on an outer circumferential surface thereof;

a collet operably disposed within said frustoconical recess;

a nut member rotationally configured with said body member to move said collet axially within said frustoconical recess;

said nut member comprising an outer sleeve member and an inner sleeve member concentric within said outer sleeve member, said inner sleeve member having a threaded inner circumferential surface for threaded engagement with said body member threads, said inner sleeve member having ball grooves defined on an outer circumferential surface thereof;

said outer sleeve member having ball grooves defined on an inner circumferential surface thereof radially opposite said inner sleeve member ball grooves, said outer sleeve axially movable relative to said inner sleeve member and further comprising a collet engaging member engaging and moving said collet axially within said frustoconical recess;

rolling bodies operably disposed in said inner sleeve member and outer sleeve member ball grooves;

wherein upon rotation of said nut member on said body member in a tightening direction, said outer sleeve member advances axially in said tightening direction relative to said inner sleeve member through operation of said rolling bodies in said ball grooves thereby forcing said collet further into said frustoconical recess; and wherein a limited rotational frictional load is defined between said outer sleeve member and said inner sleeve member so that they initially rotate together as said nut member is threaded onto said body member.

2. The collet chuck device as in claim 1, wherein said body member comprises a collet tool holder.

3. The collet chuck device as in claim 1, wherein said nut member is removable from said body member.

4. The collet chuck device as in claim 3, wherein said collet is replaceable.

5. The collet chuck device as in claim 1, wherein said nut member further comprises a grip-enhancing outer circumferential surface.

6. The collet chuck device as in claim 5, wherein said grip-enhancing surface is defined on an outer circumferential surface of said outer sleeve member.

7. The collet chuck device as in claim 1, further comprising an adjustment click ring disposed concentric about said inner sleeve member, said click ring having flexible arm members that releasably engage with detents in said outer sleeve member.

8. The collet chuck as in claim 1, wherein said collet engaging member comprises a ring member rotationally coupled to said outer sleeve member at a forward end thereof.

9. The collet chuck as in claim 1, wherein said rolling bodies are carried in a ball cage.

10. A collet chuck device, comprising:

a body member having a frustoconical recess defined therein for receipt of a collet, and threads defined on an outer circumferential surface thereof;

a nut member threadedly engaged with said body member threads and configured to axially move a collet within said frustoconical recess;

said nut member comprising an outer sleeve member and an inner sleeve member concentric within said outer sleeve member, said inner sleeve member having a threaded inner circumferential surface for threaded engagement with said body member threads, said outer sleeve axially movable relative to said inner sleeve member and further comprising a collet engaging member engaging and moving said collet axially within said frustoconical recess;

a rotational coupling device disposed between and rotationally coupling said inner and outer sleeve members; and wherein a limited frictional load exists between said outer sleeve member and said inner sleeve member such that upon rotation of said nut member on said body member in a tightening direction, said outer sleeve member and said inner sleeve member rotate together until said frictional load is overcome and said outer sleeve member advances axially in said tightening direction relative to said inner sleeve member through operation of said rotational coupling device thereby forcing said collet further into said frustoconical recess.

11. The collet chuck device as in claim 10, wherein said rotational coupling device comprises rolling bodies disposed in oppositely facing grooves defined in said inner and outer sleeve members.

12. The collet chuck device as in claim 10, further comprising means for preventing said outer sleeve from rotating relative to said inner sleeve member in a non-tightening direction.

13. The collet chuck device as in claim 12, wherein said means includes an axially loadable click ring disposed concentric about said inner sleeve member and releasably engaging with said outer sleeve member.

* * * * *